7/15/86 OR 4,600,948

United States Patent [19]

Dangschat

[11] Patent Number: 4,600,948

[45] Date of Patent: Jul. 15, 1986

[54] METHOD TO SWITCH-OFF THE STANDBY OPERATION OF A TELEVISION RECEIVER

[75] Inventor: Rainer Dangschat, Landsham, Fed. Rep. of Germany

[73] Assignee: Siemens Aktiengesellschaft, Munich, Fed. Rep. of Germany

[21] Appl. No.: 734,802

[22] Filed: May 15, 1985

Related U.S. Application Data

[63] Continuation of Ser. No. 417,092, Sep. 13, 1982, abandoned.

[30] Foreign Application Priority Data

Sep. 17, 1981 [DE] Fed. Rep. of Germany ....... 3137063

[51] Int. Cl.[4] ........ H04N 5/63

[52] U.S. Cl. ........ 358/190; 358/194.1; 455/217; 455/343; 455/352

[58] Field of Search ............ 358/188, 181, 190, 194.1, 358/115, 114; 455/231, 127, 217, 230, 343, 352, 353; 340/309.15, 309.5, 309.6; 307/140, 141, 141.4, 141.8

[56] References Cited

U.S. PATENT DOCUMENTS

| | | | |
|---|---|---|---|
| 3,603,732 | 9/1971 | George | 358/190 |
| 3,811,090 | 5/1974 | Uchida | 358/190 |
| 3,940,701 | 2/1976 | Novitski | 358/194.1 |
| 4,024,577 | 5/1977 | Diethelm | 358/190 |
| 4,271,432 | 6/1981 | Suzuki | 358/190 |
| 4,279,012 | 7/1981 | Beckedorff | 455/231 |
| 4,313,227 | 1/1982 | Eder | 455/608 |

FOREIGN PATENT DOCUMENTS

| | | | |
|---|---|---|---|
| 2983 | 7/1979 | European Pat. Off. | 358/190 |
| 20724 | 2/1978 | Japan | 358/190 |
| 117929 | 10/1978 | Japan | 358/190 |

*Primary Examiner*—Tommy P. Chin

*Attorney, Agent, or Firm*—Herbert L. Lerner; Laurence A. Greenberg

[57] ABSTRACT

Method of switching off the stand-by operation of a television receiver including a microprocessor, which includes providing the microprocessor in the form of a timer, and switching off the receiver with the timer after a given length of time, and a receiver for carrying out the method.

2 Claims, 1 Drawing Figure

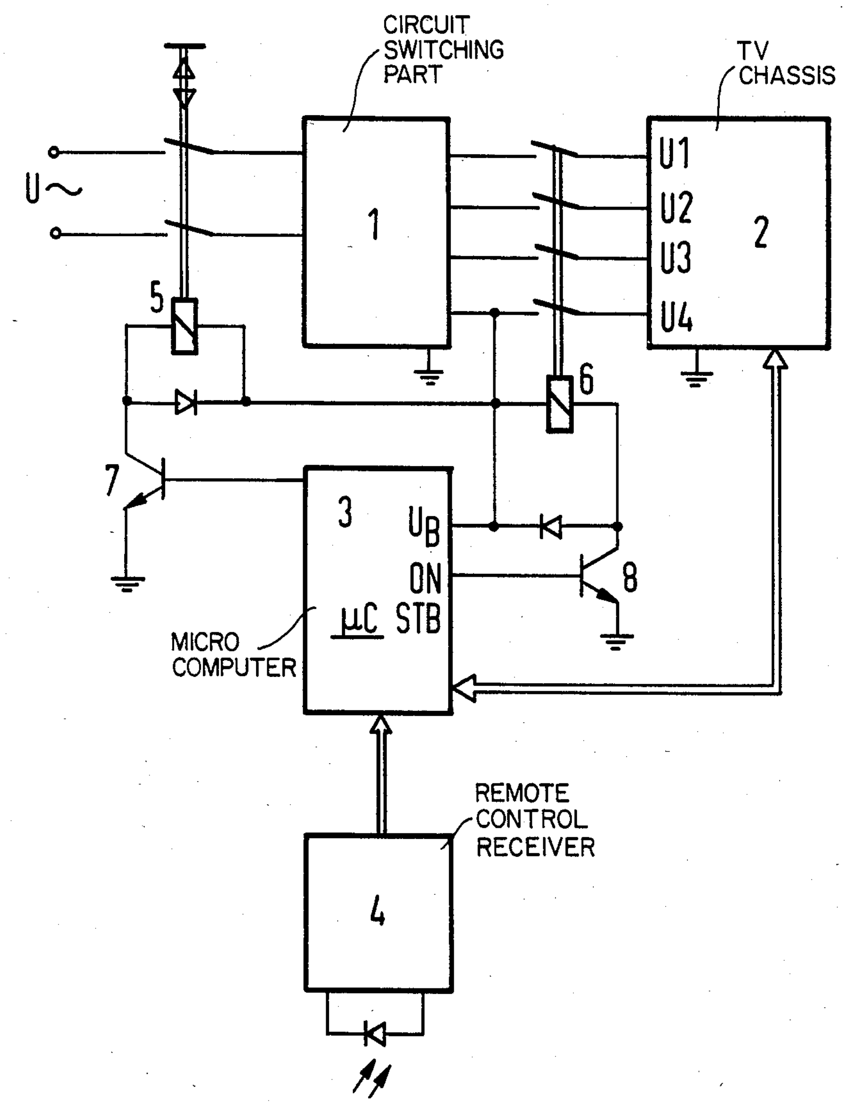
CIRCUIT SWITCHING PART
TV CHASSIS
U~
1
U1
U2
U3
U4
2
5
6
7
3
UB
ON
STB
μC
8
MICRO COMPUTER
REMOTE CONTROL RECEIVER
4

METHOD TO SWITCH-OFF THE STANDBY OPERATION OF A TELEVISION RECEIVER

This application is a continuation, of application Ser. No. 417,092, filed Sept. 13, 1982, now abandoned.

BACKGROUND OF THE INVENTION

The invention relates to a method of switching off the stand-by operation of a television receiver which contains a micro-processor, and a receiver for carrying out the method.

DESCRIPTION OF THE PRIOR ART

Modern television receivers, especially color television sets, are often equipped with a remote control, and have three operating modes, i.e. switched off, stand-by or waiting, and switched on with picture and sound-reception.

During the stand-by or waiting mode of operation, an infra-red preamplifier and a receiver-decoder circuit are supplied with current by a stand-by circuit portion. This stand-by circuit portion may be a separate circuit including a 50 Hz transformer, rectifier, filter and stabilizer, or the power supply section existing in the set can also continue to operate during the stand-by operation.

Usually, the television set remains in the stand-by function all day long, and this state is indicated to the user by a light display, such as a red LED. This serves the purpose of reminding the user to switch off the device at night, so that the device is completely separated from the current network or supply for safety reasons.

The stand-by operation only uses a little power, approximately 10 W, but has a safety risk which, according to statistics, should not be neglected, it is therefore recommended to disconnect the receiver completely at night and during extended absences, for example during a vacation.

Furthermore, the danger exists that a light reflection, for instance, may be wrongly interpreted as an infra-red switch-on command and that the receiver may therefore be unintentionally switched on. It is accordingly an object of the invention to provide a method of switching off the stand-by operation of a television receiver, and a receiver for carrying out the method, which overcomes the hereinfore-mentioned disadvantages of the heretofore-known methods and devices of this general type.

With the foregoing and other objects in view there is provided, in accordance with the invention a method of switching off the standby operation of a television receiver including a microprocessor, which includes providing the microprocessor in the form of a timer, and switching off the receiver with the timer after a given length of time.

SUMMARY OF THE INVENTION

In this way, an advantage is obtained in that by means of the microprocessor which already exists in the television receiver, such as in the frequency synthesis-tuning system, a timer switch can be provided, which completely switches off the device, after 5 hours standby operation, for example. The method according to the invention accomplishes the result that after a certain period of stand-by operation, the set is completely separated from the current supply, thereby reducing the danger of fire, and additionally obtaining a small current saving as well.

In accordance with a concomitant mode of the invention, there is provided a power supply switch connected to the microprocessor, the switch being movable between an on-position and a rest-position and having a magnetic coil, which includes applying a current pulse or interruption from the microprocessor to the magnetic coil for returning the switch to the rest position and switching off the receiver. For switching the device on again, the power supply switch must then be newly pressed again, as usual.

In accordance with an apparatus for carrying out the method of the invention, there is provided a television receiver, including a microprocessor in the form of a timer issuing current pulses or interruptions for switching off the receiver after a given length of time, and a power supply switch connected to the microprocessor being movable between an on and a rest postition and having a magnetic coil receiving the current pulses or interruptions for returning said switch to the rest position and switching off the receiver.

Other features which are considered as characteristics for the invention are set forth in the appended claims.

Although the invention is illustrated and described herein as embodied in a method of switching off the stand-by operation of a television receiver, and a receiver for carrying out the method, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The single drawing shows a block diagram of the invention with the major function blocks and their inter-connections.

DESCRIPTION OF THE PREFERRED EMBODIMENT

The construction and method of operation of the invention, however, together with additional objects and advantages thereof will be best understood from the following description of specific embodiments when read in connection with the single FIGURE of the drawing which is a schematic form of a circuit diagram of a device which illustrates the method of the invention.

Referring now in detail to the single FIGURE of the drawing, it is seen that by activating a circuit switch 5 (which is magnetically released), the equipment is supplied with a 220 V voltage U∼. In stand-by operation, only the appropriate components, such as a remote-control receiver 4 and a micro-computer 3 operate. These components are, for example, supplied from a circuit switching part 1, which also supplies the TV chassis 2 when operating with voltages in an ON-state. After de-coding the start or on-command, the microcomputer 3 is connected through an amplifier 8 to a relay 6, which in turn connects the voltage to the chassis. An OFF-command makes the relay 6 deenergize. When a definite time has passed after the last activation (for example 5 hours), or after the last control-command by the user (for example 24 hours), the microcomputer 3 then activates the start-up of the current supply or circuit switch 5 through an amplifier 7, after which it turns itself off, and separates the entire equipment from the circuit or current supply. The switch 5 can, of course, again be turned off manually.

I claim:

1. Method for controlling a power supply for a television receiver which has operating modes "on", "stand-by" and "off" and wherein the television receiver includes a microprocessor having a timer function and a master switch having a trigger winding for switching the receiver from the "stand-by" to the "off" mode, the method which comprises:

operating the microprocessor as a timer for changing the receiver from the "stand-by" mode to the "off" mode, after the receiver has been in the "stand-by" mode only for a defined length of time;

setting the master switch to the "off" mode by activating said trigger winding in response to an "off" command from the microcomputer;

disconnecting completely said television receiver, including said microprocessor from said power supply, in response to said master switch being in the "off" mode.

2. Method according to claim 1, further comprising the steps of:

starting said timer function at the beginning of said "stand-by" mode;

resetting said timer function at any beginning of said "on" mode.

* * * * *